United States Patent [19]
Geiger et al.

[11] Patent Number: 5,987,022
[45] Date of Patent: Nov. 16, 1999

[54] METHOD FOR TRANSMITTING MULTIPLE-PROTOCOL PACKETIZED DATA

[75] Inventors: Robert L. Geiger, Algonquin; Kenneth J. Crisler, Lake Zurich; Michael J. Crowley, Oak Park; Richard A. Comroe, South Barrington, all of Ill.

[73] Assignee: Motorola, Inc., Schaumburg, Ill.

[21] Appl. No.: 08/777,215

[22] Filed: Dec. 27, 1996

[51] Int. Cl.[6] .............................. H04I 15/00; H04L 12/28
[52] U.S. Cl. ............................................................ 370/349
[58] Field of Search .................................. 370/477, 470, 370/471, 392, 400, 401, 410, 465, 417, 466, 467, 469, 428, 522; 375/240; 371/32, 33

[56] References Cited

U.S. PATENT DOCUMENTS

| | | | |
|---|---|---|---|
| 5,293,379 | 3/1994 | Carr | 370/94.1 |
| 5,374,916 | 12/1994 | Chu | 340/146.2 |
| 5,535,199 | 7/1996 | Amri et al. | 370/60 |

*Primary Examiner*—Michael Horabik
*Assistant Examiner*—M. Phan
*Attorney, Agent, or Firm*—James A. Coffing; Val Jean F. Hillman

[57] ABSTRACT

A data communication system employs a method (400) for transmitting packetized data (100) using a combination of well known transmission techniques, such as TCP/IP and a novel compression process. A message type identifier (300) for the packet to be transmitted is first identified, which identifier comprises a packet type identifier (113) and a protocol identifier (114). The packet type identifier (113) distinguishes between control information and user information in the data packet. The packet is then selectively encoded (407, 411) using either a first or a second header compression technique, depending on the packet type identifier (113) and the protocol identifier (114). In this manner, an improved packet transmission scheme is envisaged, which gives a reliable solution for data transmission in a noisy RF environment and/or a bandwidth-limited environment. The method (400) for transmitting packetized data (100) further anticipates a third header compression technique (417) for use when the packet to be transmitted includes a UDP message.

7 Claims, 2 Drawing Sheets

METHOD FOR TRANSMITTING MULTIPLE-PROTOCOL PACKETIZED DATA

FIELD OF THE INVENTION

The present invention is generally related to data communication systems, and more particularly to a method of transmitting packetized data throughout such a system.

BACKGROUND OF THE INVENTION

Wireless radio communication systems are known. Such systems can be designed for the radio frequency (RF) transmission of voice and/or data. While there are many transmission schemes available for the transmission of voice, there are only a small number of such techniques that can be reliably used for the transmission of data. Further, due to the length and nature of the informational content, the transmission of data is subject to a variety of limitations. Among these are available bandwidth and conflicting compression techniques.

RF data transmission schemes operate in a bandwidth-limited environment. Today, when forward error correction (FEC) is added to data transmissions, an effective throughput of approximately 14400 bits per second (14.4 kbps) per RF channel is feasible. This throughput must be shared between multiple users of the channel resource. Compare this situation with users of a wireline WAN (where each user may have upwards of 28.8 kbps capacity, no matter how many users), or a high speed WAN (where many users share an aggregate throughput between 10,000,000 bits per second, 10 Mbps, and 145 Mbps). To emphasize the disparity between a wireless and wireline system, consider a fully loaded RF data system supporting 100 users equally; here, single user throughput is 0.5% to $10^{-6}$ the throughput of available wireline data systems.

In a typical RF data transmission scheme, packet data messages contain headers, which are used to control the protocol functions. These headers can consume considerable bandwidth on an RF channel, hence it is desirable to compress these headers. There are two levels of header-specific compression techniques typically employed; a first level of compression is obtained by removing redundant, static (unchanging during a communication session) information. A second level of compression is obtained by encoding only the differences of infrequently or slowly changing fields as differences (commonly referred to as differential encoding). It is known that differential encoding substantially improves performance for many protocols, but requires state information to be maintained at the sending and receiving end. Detrimentally, if any packets are lost or damaged on the RF link, some means of re-establishing this state information must be provided. This is true of all types of headers, including those used in the transmission control protocol/internet protocol (TCP/IP) scheme, as described below.

A known method developed by Van Jacobson for compressing TCP/IP headers uses both removal of redundant static information and differential encoding of predictably changing information. This method achieves favorable compression results and uses the overlying TCP error correction procedures to reset the state after an error occurs. While this is a simple solution to the problems involving the state information, it creates significant problems in RF environments. In particular, these environments typically introduce frequent errors, many of which can be characterized as burst, or short duration, errors. When such an error occurs, data transmission stops until the protocol times out and retries sending. Not only is undesirable delay introduced, but TCP assumes all errors are due to network congestion and initiates congestion control procedures. Of course, this is not always a correct response, unnecessarily resulting in further degradation in performance. It should be noted that this scheme works well in an environment of limited errors (i.e., wireline), but not in a typical RF environment.

For an RF environment, system designers are urged to use a reliable link to minimize the possibility of data loss. While this approach is acceptable for packets containing user data, it typically is not acceptable for small control packets, such as acknowledgments. As is known, these acknowledgments are commonly sent by TCP in the reverse direction during a data transfer. Further, they include a great deal of redundancy—i.e., if a few acknowledgments get lost it will not affect TCP. While it would be beneficial to avoid the costly use of a reliable link for these shortened packets, the current art in header compression requires us to use them in order to maintain compressor state.

It is known that connectionless protocols such as UDP do not employ acknowledgments, so failed transmissions of differentially encoded header fields are treated no differently from failed transmissions of non-UDP packets in current packet radio systems. For this reason, current RF packet data applications are connectionless and transaction oriented. That is, each message is directed to its recipient without maintaining a connection context between the message endpoints, and each message contains the data for a single transaction. With the inclusion of IP and UDP headers, current legacy applications can remain otherwise unchanged, allowing application development cost savings, while graduating to the generality of IP solutions.

Thus, it is envisaged that, in an IP-based RF data system, TCP can be used to support commercial, generalized applications ("horizontal"), while UDP can support legacy, specialized, transaction applications ("vertical"). The desire to support both application types on a single mobile computing platform requires efficient use of available bandwidth. This efficiency might be gained by reducing message size for UDP datagrams via differential header compression, while simultaneously reducing retransmissions of TCP packets (resulting from lost acknowledgments) by providing delivery of ACK packets optimized for robust RF delivery.

Accordingly, there exists a need for a wireless data communication system that takes advantage of existing compression techniques while being adaptive to transmission protocols that are advantageous for the robust transmission of RF data. In particular, a packet transmission scheme that operates in a limited bandwidth environment and has improved error correction would be an improvement over the prior art.

DETAILED DESCRIPTION OF A PREFERRED EMBODIMENT

The present invention encompasses a data communication system that employs a method for transmitting packetized data using a combination of well known transmission techniques and one of a plurality of novel compression processes. A message type identifier for the packet to be transmitted is first identified, which identifier comprises a packet type identifier and a protocol identifier. The packet type identifier distinguishes between control information and user information in the data packet. The packet is then selectively encoded using either a first or a second header compression technique, depending on the packet type identifier and the protocol identifier. In this manner, an improved packet transmission scheme is envisaged, which delivers a reliable transmission solution in a noisy RF environment and or a bandwidth-limited environment.

Figure 1:
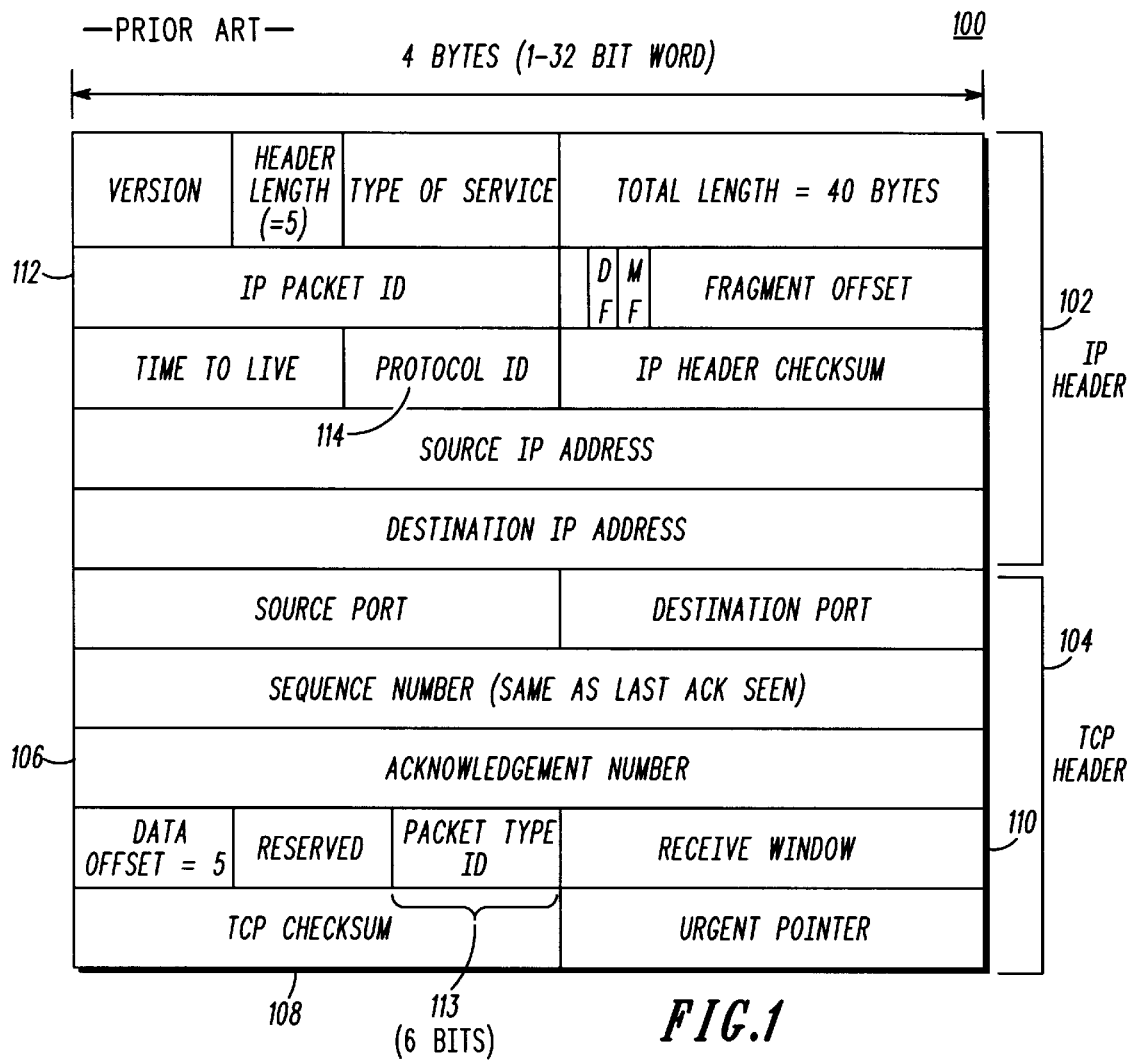
FIG. 1 shows a Transmission Control Protocol (TCP) acknowledgment message, as is known in the art.

FIG. 1 shows a TCP acknowledgment data message 100. The first portion of the message 100 is referred to as an IP header 102. This header 102 generally consists of redundant, static data. The protocol ID field 114 identifies the protocol type that this IP message is carrying, in this case TCP. Another portion of the message 100 includes the TCP header 104. A packet type identifier 113 is used to determine the type of acknowledgment used, in this case a standard TCP acknowledgment (ACK). It should be noted that the code bits comprising the packet type ID (PTI) 113 include such entries as:

URG: indicates validity/invalidity of urgent pointer field (shown in FIG. 1);

ACK: indicates whether data constitutes an acknowledgment;

PSH: indicates whether segment requests a "push";

RST: indicates whether connection reset is requested;

SYN: synchronize sequence numbers (usually only sent upon opening a connection); and FIN: indicates sender has reached end of byte stream (to initiate connection close). Other important fields are the IP packet ID number 112 and the TCP checksum 108, both of which are commonly used in prior art schemes. The receive window 110 indicates the amount of data this packet is acknowledging, while the acknowledgment number 106 identifies a sequence number for this message.

Figure 2:
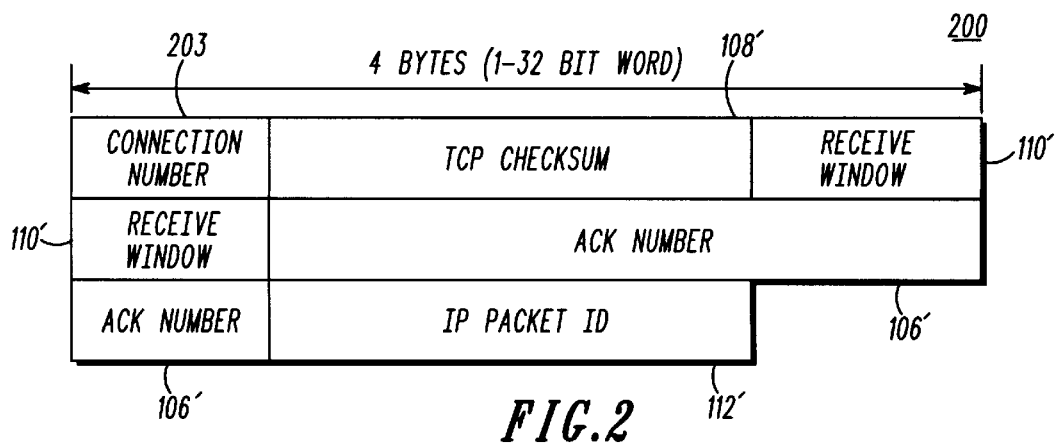
FIG. 2 shows the TCP acknowledgment message shown in FIG. 1 after compression, in accordance with the present invention.

FIG. 2 shows a TCP acknowledgment 200, in accordance with the present invention, with a portion removed and leaving a remaining portion for compression, as later described. In a TCP acknowledgment, the fields that must be transmitted (i.e., the remaining portion) in order to recreate the packet are: the receive window 110, the acknowledgment number 106, the IP packet ID number 112, and the TCP checksum 108. The removed information is either redundant or static, and is identified in totality by an assigned connection number 203. This approach allows the transmitter to encode the acknowledgment, as shown in FIG. 2. (It should be noted that the primed (') fields in FIG. 2 correspond to the unprimed fields of the same number in FIG. 1.) One of ordinary skill will realize that if one or more of these encoded acknowledgments are now lost, the receiving compressor is still able to correctly re-construct the next acknowledgment. That is, so long as TCP does not time out, it will continue to send data correctly and will not enter error recovery procedures. This allows us to send such encoded acknowledgments using a lower priority RF link protocol, and thus conserving RF resources. Of course, this provides a unique advantage over the prior art methodologies.

Figure 3:
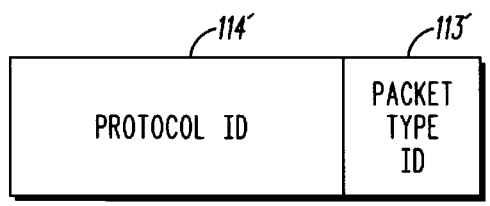
FIG. 3 shows one embodiment of a message type identifier for a TCP message, in accordance with the present invention.
Figure 4:
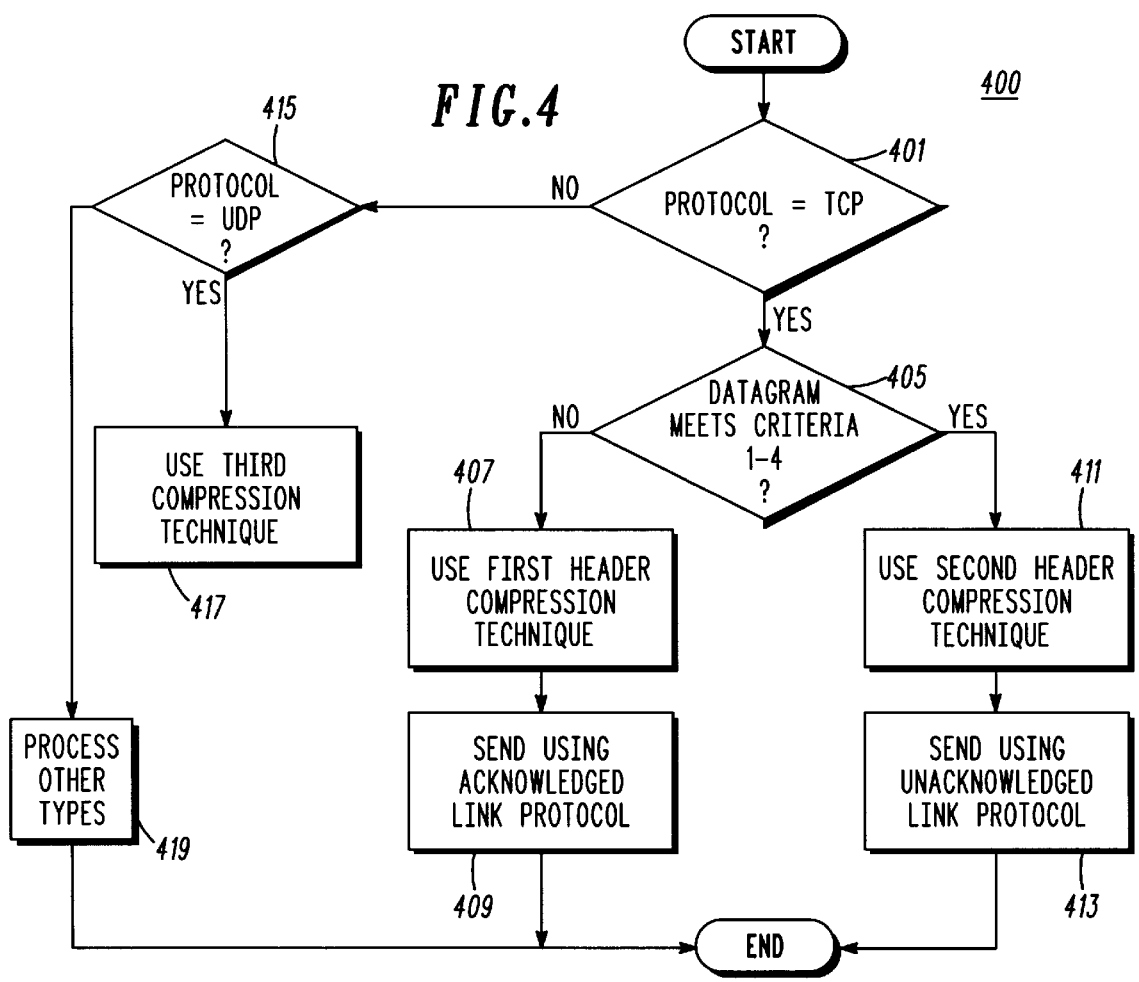
FIG. 4 shows a data flow diagram of a TCP and UDP compression methodology, in accordance with the present invention.

As illustrated, the present invention provides for a compression scheme that tolerates an unavoidable loss of TCP acknowledgments. According to the invention, a TCP acknowledgment can be characterized by a message type identifier. FIG. 3 shows a message type identifier 300 for the TCP data stream. It consists of fields 113' (6 code bit PTI field) and 114' (protocol ID field), corresponding to the data in the unprimed fields identified in FIG. 1. Since the encoded packets are smaller, they are less susceptible to loss/error; i.e., if one or two of them are lost, TCP will not be affected. In this manner, the requirement to send TCP acknowledgments reliably, to prevent compressor state loss, is obviated In accordance with the present invention, FIG. 4 depicts a flow diagram 400 illustrating the operation of a preferred embodiment. An incoming message is first checked 401 for protocol type by referring to the message type identifier. If the message type identifier indicates a TCP packet, the packet is next checked 405 to see whether the packet is a TCP acknowledgment meeting the following selection criteria: 1) whether packet is a TCP acknowledgment of length 40 bytes; 2) whether the TCP urgent pointer is invalid; 3) whether the PSH, RST, SYN, and FIN bits are all zero (determined from message type identifier 300); and 4) whether the sequence number is the same as the one in the previously seen TCP acknowledgment. If less than all the criteria 1–4 are met, a first header compression technique is applied 407 to the data stream. This first header compression technique uses differential encoding to achieve maximum possible compression. If conditions 1–4 are all met (indicating that the packet is an appropriate TCP ACK), the second header compression technique (for TCP acknowledgments) is applied 411 to the data stream. This header compression technique uses a non-differential, and therefor loss tolerant, encoding (as shown in FIG. 2). According to the invention, messages encoded with the first header compression technique are then sent 409 using an acknowledged (reliable) link protocol, while messages encoded with the second header compression technique are sent 413 using an un-acknowledged link protocol. One of ordinary skill will recognize that it is the nature of this second header compression technique (i.e., tolerant of message loss) that makes this procedure advantageous over prior art methods.

Referring again to FIG. 4, if the protocol ID suggests that it is not TCP, it is checked 415 for a UDP identifier. If the message type identifier indicates a compressed UDP datagram, a third compression/decompression technique is employed 417. (Note that for an uncompressed UDP datagram, no decompression is performed.) If the message type identifier indicates a UDP datagram with compression, then a third type of differential decompression is performed. According to the present invention, this third technique is directly analogous to a Van Jacobson decompression for TCP/IP, so no further details are required. In this way, UDP datagrams are handled with the same efficiency and effectiveness as are TCP/IP datagrams. Similarly, other types of datagrams can be processed 419, before the routine is exited. It is this ability to handle multiple data protocols that provides the designer with a distinct advantage over using prior art methods.

A number of configurations involving the proposed TCP RF robust ACK mechanism and differential UDP header compression are possible. Assume a mobile RF device embodying the invention connected to a mobile host computer via an asynchronous SLIP connection. The device could decompress TCP and UDP headers as described, and forward the IP datagrams to the mobile host as completely decompressed messages, or re-compress the TCP datagrams only, according to standard Van Jacobson usage in Compressed SLIP. The first method would make the device available to the largest number of commercially available IP communication stack software packages. The second embodiment requires a host IP stack that provides compressed SLIP services, but minimizes the bandwidth utilization on the serial interface. When RF data rates increase, this minimized serial bandwidth use could mean that the serial data rate need not be similarly increased.

By selectively encoding not only different protocols, but message types within such protocols (such as the TCP acknowledgment), the problems associated with transmission of TCP/IP data over RF systems outlined previously have been solved. The acknowledgments generated by TCP can be encoded and sent unreliably without danger of causing the compressor to lose state, thus conserving precious RF resources and allowing maximum performance. Further, the simultaneous support of other protocols, such as UDP, allows for maximum bandwidth conservation for legacy RF systems.

What is claimed is:

1. In a wireless data communication system, a method for transmitting packetized data comprising the steps of:

for a packet to be transmitted that comprises control information and user information, identifying a message type identifier that comprises a packet type identifier and a protocol identifier, wherein the packet type identifier distinguishes between said control information and said user information; and selectively encoding the packet to be transmitted by applying one of a header compression techniques, wherein at least one of said plurality of header compression techniques further comprises the steps of:

removing a predetermined portion of the packet to produce a removed portion and a remaining portion; and compressing the remaining portion of the packet.

2. The method of claim 1, wherein the control information comprises a transmission control protocol/internet protocol (TCP/IP) acknowledgment header.

3. The method of claim 1, wherein at least one of said plurality of header compression techniques comprises the step of differential encoding the user information using a Van Jacobson-based compression technique.

4. The method of claim 3, wherein the user information comprises an information signal other than a TCP/IP acknowledgment header.

5. The method of claim 1, wherein the user information comprises a UDP datagram.

6. In a wireless data communication system, a method for transmitting TCP/IP data comprising the steps of:

for a packet to be transmitted, determining whether the packet to be transmitted includes a TCP/IP acknowledgment header; and if the packet to be transmitted includes a TCP/IP acknowledgment header, encoding the TCP/IP acknowledgment header by removing a predetermined portion of the TCP/IP acknowledgment header; and compressing a remaining portion of the TCP/IP acknowledgment header.

7. In a wireless data communication system, a method for transmitting TCP/IP and UDP datagrams comprising the steps of:

identifying a first header compression technique corresponding to a Van Jacobson compression technique;

identifying a second header compression technique that is different from the first header compression technique;

identifying a third header compression technique that is different from the first and second header compression techniques;

for a packet to be transmitted, determining whether the packet to be transmitted includes one of a compressible UDP message and TCP/IP acknowledgment header;

if the packet to be transmitted includes a compressible UDP message, encoding the packet to be transmitted by applying the third header compression technique, if the packet to be transmitted includes a TCP/IP acknowledgment header, encoding the packet by applying the first header compression technique when less than a set of predetermined criteria are met, and encoding the packet by applying the second header compression technique when the set of predetermined criteria are met, the second header compression technique further comprising the steps of:

removing a predetermined portion of the TCP/IP acknowledgment header; and compressing a remaining portion of the TCP/IP acknowledgment header.

* * * * *

UNITED STATES PATENT AND TRADEMARK OFFICE
CERTIFICATE OF CORRECTION

PATENT NO : 5,987,022
DATED : Nov. 16, 1999
INVENTOR(S): Robert L. Geiger et al.

It is certified that error appears in the above-identified patent and that said Letters Patent are hereby corrected as shown below:

In claim 1, line 28, please insert the text --plurality of-- after the word "a" and before the word "header"

Signed and Sealed this

Tenth Day of April, 2001

Attest:

NICHOLAS P. GODICI

Attesting Officer

Acting Director of the United States Patent and Trademark Office